United States Patent
Prasanna Kumar et al.

(10) Patent No.: US 11,750,473 B2
(45) Date of Patent: Sep. 5, 2023

(54) SYSTEM FOR OPTIMISING DATA COMMUNICATION

(71) Applicant: SINGAPORE TELECOMMUNICATIONS LIMITED, Singapore (SG)

(72) Inventors: Manoj Prasanna Kumar, Singapore (SG); Eng Huk Mark Koh, Singapore (SG); Her Her Dennis Wong, Singapore (SG); York Chye Chang, Singapore (SG)

(73) Assignee: SINGAPORE TELECOMMUNICATIONS LIMITED, Singapore (SG)

( * ) Notice: Subject to any disclaimer, the term of this patent is extended or adjusted under 35 U.S.C. 154(b) by 0 days.

(21) Appl. No.: 17/433,262

(22) PCT Filed: Feb. 27, 2020

(86) PCT No.: PCT/SG2020/050093
§ 371 (c)(1),
(2) Date: Aug. 24, 2021

(87) PCT Pub. No.: WO2020/176041
PCT Pub. Date: Sep. 3, 2020

(65) Prior Publication Data
US 2022/0141099 A1 May 5, 2022

(30) Foreign Application Priority Data
Feb. 27, 2019 (SG) .......................... 10201901772X

(51) Int. Cl.
*H04L 41/5019* (2022.01)
*H04L 41/5009* (2022.01)
*H04L 45/00* (2022.01)

(52) U.S. Cl.
CPC ...... *H04L 41/5019* (2013.01); *H04L 41/5009* (2013.01); *H04L 45/22* (2013.01)

(58) Field of Classification Search
CPC .. H04L 41/5019; H04L 41/5009; H04L 45/22
See application file for complete search history.

(56) References Cited

U.S. PATENT DOCUMENTS

| 10,700,962 B2 | 6/2020 | Karthikeyan et al. |
| 2012/0173708 A1* | 7/2012 | Bartfai-Walcott .... G06F 9/5072 709/224 |

(Continued)

FOREIGN PATENT DOCUMENTS

| CN | 102981912 A | 3/2013 |
| CN | 103685563 A | 3/2014 |

(Continued)

OTHER PUBLICATIONS

NGMN Alliance, "5G Network and Service Management including Orchestration", Mar. 2017, pp. 1-32.

*Primary Examiner* — Chris Parry
*Assistant Examiner* — Steven C Nguyen
(74) *Attorney, Agent, or Firm* — THE WEBB LAW FIRM

(57) ABSTRACT

According to a first aspect of the invention, there is provided a system for optimising data communication between devices connected to a network, the system including: a server configured to: measure application performance metrics of the data communication between the devices; compare the application performance metrics against performance requirements; detect, in response to the application performance metrics being below the performance requirements, nodes having untapped computing resources within the network; determine operation parameters achieving service at the performance requirements; command one or more of the nodes to function at the operation parameters;

(Continued)

and migrate at least a portion of workload associated with the data communication amongst the one or more nodes commanded to function at the operation parameters.

20 Claims, 7 Drawing Sheets

(56) References Cited

U.S. PATENT DOCUMENTS

| | | | | |
|---|---|---|---|---|
| 2013/0061225 | A1* | 3/2013 | Nakagawa | G06F 9/45558 718/1 |
| 2013/0081046 | A1 | 3/2013 | Accola et al. | |
| 2014/0094208 | A1 | 4/2014 | Egner et al. | |
| 2015/0032894 | A1* | 1/2015 | Rosensweig | G06F 9/5088 709/226 |
| 2015/0222549 | A1 | 8/2015 | Kakadia et al. | |
| 2015/0347183 | A1* | 12/2015 | Borthakur | G06F 9/5088 718/105 |
| 2016/0269313 | A1* | 9/2016 | Brooker | G06F 9/5072 |
| 2016/0380893 | A1* | 12/2016 | Chopra | H04L 43/12 370/392 |
| 2017/0149687 | A1* | 5/2017 | Udupi | H04L 47/78 |
| 2018/0084037 | A1* | 3/2018 | Birkestrand | H04L 67/10 |
| 2018/0167450 | A1 | 6/2018 | Cherukur et al. | |
| 2019/0332443 | A1* | 10/2019 | Kelly | G06F 9/5083 |
| 2020/0076851 | A1* | 3/2020 | Rantzau | H04L 63/04 |
| 2021/0103481 | A1* | 4/2021 | Bernat | G06F 9/5088 |

FOREIGN PATENT DOCUMENTS

| | | |
|---|---|---|
| CN | 104317650 A | 1/2015 |
| CN | 107404523 A | 11/2017 |
| EP | 3318012 B1 | 12/2020 |

* cited by examiner

SYSTEM FOR OPTIMISING DATA COMMUNICATION

CROSS-REFERENCE TO RELATED APPLICATIONS

This application is the United States national phase of International Application No. PCT/SG2020/050093 filed Feb. 27, 2020, and claims priority to Singaporean Patent Application No. 10201901772X filed Feb. 27, 2019, the disclosures of which are hereby incorporated by reference in their entirety.

BACKGROUND OF THE INVENTION

Field of the Invention

The present invention relates to a system for optimising data communication in a network.

Description of Related Art

Hardware and software assets have an important role in the evolution of the Internet of Things (IoT) and 5G networks. Hardware assets include devices/sensors that collect information from different IoT environments; gateways that collect, process and transmit device information to cloud and telecom network assets like routers; and cell towers that facilitate connectivity to the cloud. Software assets include firmware that run in devices/gateways to enable protocol translation and authentication; network functions that enable different configuration settings in cellular networks; and applications that are deployed on the cloud for reporting and notification.

Application behaviour thus has to be monitored across multiple layers like hardware infrastructure, resource consumption, network performance and application performance. Guaranteeing application performance becomes difficult because providers of applications, devices, connectivity and infrastructure use their own firmware, operation systems (OS) and proprietor technology. For example, an application cannot request higher bandwidth in real time without going through a complex support process.

There is thus a need for a framework that can perform multi-layered control and multi-point control to simplify deployment, operation and optimisation of IoT applications that can guarantee that applications performance in accordance with service level agreements.

SUMMARY OF THE INVENTION

According to a first aspect of the present invention, there is provided a system for optimising data communication between devices connected to a network, the system comprising: a server configured to: measure application performance metrics of the data communication between the devices; compare the application performance metrics against performance requirements; detect, in response to the application performance metrics being below the performance requirements, nodes having untapped computing resources within the network; determine operation parameters achieving service at the performance requirements; command one or more of the nodes to function at the operation parameters; and migrate at least a portion of workload associated with the data communication amongst the one or more nodes commanded to function at the operation parameters.

The data communication of the first aspect may be effected by a deployed application and the application performance metrics may comprise usage of computer infrastructure that process the data communicated by the deployed application. The usage of the computer infrastructure may include any one or more of throughput, latency, processor load average, processor utilisation and memory utilisation.

The network of the first aspect may be regulated by a communication protocol, the communication protocol implementing an intelligence layer to which the server belongs, the intelligence layer determining a path for a communication channel for the data communication. One of the servers may be designated a master server and each of the remaining servers designated as a slave server. The communication protocol may further implement an orchestration layer, wherein the system further comprises terminals that belong to the orchestration layer, the terminals being configured to execute decisions made by the servers belonging to the intelligence layer. The decisions that the terminals execute may comprise choosing one or more of the nodes to migrate the portion of the workload. The communication protocol may further implement a transformation layer, wherein the system further comprises data processing libraries that belong to the transformation layer, the data processing libraries being configured to facilitate transformation of the received data into a format compatible with protocol used in other layers implemented by the communication protocol.

The determination of the operation parameters of the first aspect may result from predicting information relating to any one or more of a reaction time before there is performance degradation beyond a threshold value, current infrastructure performance, load factor and predicted deviation in expected application performance.

One or more of the nodes of the first aspect may be located in any one of the following locations within the network: a network edge; a telecommunication network; or a cloud computer network.

Where a path is determined for a communication channel for the data communication, the migration of the first aspect may comprise diverting the communication channel through the one or more nodes commanded to function at the operation parameters. The diverted communication channel may have a different path compared to the communication channel before the migration of the workload. The server may be further configured to: assign an interval for the migration; release the nodes on which the portion of the workload is migrated, after the interval has passed; and return the communication channel to the path before the migration of the workload.

Where the server of the first aspect determines a path for the communication channel, at least one node along the communication channel may remain the same after the migration of the portion of the workload.

Where the data communication of the first aspect is effected by a deployed application, the workload may comprise computation required to process the data communicated by the deployed application. One or more of the nodes that share the computation may belong to a cluster within a same network.

The server of the first aspect may be further configured to compare the application performance metrics against performance requirements in response to the server detecting a deterioration in the measured application performance metrics.

The determination of the operation parameters to achieve service at the performance requirements of the first aspect may be computed by a classification algorithm that models a relationship between the network cost and performance optimisation. Alternatively, the determination of the operation parameters to achieve service at the performance requirements may result from a selection from a list of available operation parameters.

According to a second aspect of the invention, there is provided a computer implemented method for optimising data communication between devices connected to a network, the method comprising: measuring application performance metrics of the data communication between the devices; comparing the application performance metrics against performance requirements; detecting, in response to the application performance metrics being below the performance requirements, nodes having untapped computing resources within the network; determining operation parameters achieving service at the performance requirements; commanding one or more of the nodes to function at the operation parameters; and migrating at least a portion of workload associated with the data communication amongst the one or more nodes commanded to function at the operation parameters.

The data communication of the second aspect may be effected by a deployed application and the application performance metrics may comprise usage of computer infrastructure that process the data communicated by the deployed application. The usage of the computer infrastructure may include any one or more of throughput, latency, processor load average, processor utilisation and memory utilisation.

The network of the second aspect may be regulated by a communication protocol, the communication protocol implementing an intelligence layer that determines a path for a communication channel for the data communication. The communication protocol may further implement an orchestration layer configured to execute decisions made by the intelligence layer. The decisions that the intelligence layer executes may comprise choosing one or more of the nodes to migrate the portion of the workload. The communication protocol may further implement a transformation layer configured to facilitate transformation of the received data into a format compatible with protocol used in other layers implemented by the communication protocol.

The determination of the operation parameters of the second aspect may result from predicting information relating to any one or more of a reaction time before there is performance degradation beyond a threshold value, current infrastructure performance, load factor and predicted deviation in expected application performance.

One or more of the nodes of the second aspect may be located in any one of the following locations within the network: a network edge; a telecommunication network; or a cloud computer network.

Where a path is determined for a communication channel for the data communication, the migration of the second aspect may comprise diverting the communication channel through the one or more nodes commanded to function at the operation parameters. The diverted communication channel may have a different path compared to the communication channel before the migration of the workload. The method of the second aspect may then assign an interval for the migration; release the nodes on which the portion of the workload is migrated, after the interval has passed; and return the communication channel to the path before the migration of the workload.

Where the network of the second aspect is regulated by a communication protocol that implements an intelligence layer that determines a path for a communication channel for the communication channel, at least one node along the communication channel may remain the same after the migration of the portion of the workload.

Where the data communication of the second aspect is effected by a deployed application, the workload may comprise computation required to process the data communicated by the deployed application. One or more of the nodes that share the computation may belong to a cluster within a same network.

The comparison of the application performance metrics against performance requirements of the second aspect may be in response to detecting a deterioration in the measured application performance metrics.

The determination of the operation parameters to achieve service at the performance requirements of the second aspect may be computed by a classification algorithm that models a relationship between the network cost and performance optimisation. Alternatively, the determination of the operation parameters to achieve service at the performance requirements may result from a selection from a list of available operation parameters.

According to a third aspect of the invention, there is provided a non-transitory processor-readable medium storing code for optimising data communication between devices connected to a network, the code representing instructions that when executed cause a processor to: measure application performance metrics of the data communication between the devices; compare the application performance metrics against performance requirements; detect, in response to the application performance metrics being below the performance requirements, nodes having untapped computing resources within the network; determine operation parameters achieving service at the performance requirements; command one or more of the nodes to function at the operation parameters; and migrate at least a portion of workload associated with the data communication amongst the one or more nodes commanded to function at the operation parameters.

The data communication of the third aspect may be effected by a deployed application and the application performance metrics may comprise usage of computer infrastructure that process the data communicated by the deployed application. The usage of the computer infrastructure may include any one or more of throughput, latency, processor load average, processor utilisation and memory utilisation.

The network may be regulated by a communication protocol, the communication protocol implementing an intelligence layer to which a server incorporating the processor of the third aspect belongs, the intelligence layer determining a path for a communication channel for the data communication. One of the servers of the intelligence layer may be designated a master server and each of the remaining servers designated as a slave server. The communication protocol may further implement an orchestration layer that comprises terminals that are configured to execute decisions made by the servers belonging to the intelligence layer. The decisions that the terminals execute may comprise choosing one or more of the nodes to migrate the portion of the workload. The communication protocol may further implement a transformation layer comprising data processing libraries that are configured to facilitate transformation of the received data into a format compatible with protocol used in other layers implemented by the communication protocol.

The determination of the operation parameters of the third aspect may result from predicting information relating to any one or more of a reaction time before there is performance degradation beyond a threshold value, current infrastructure performance, load factor and predicted deviation in expected application performance.

One or more of the nodes of the third aspect may be located in any one of the following locations within the network: a network edge; a telecommunication network; or a cloud computer network.

Where a path is determined for a communication channel for the data communication, the migration of the third aspect may comprise diverting the communication channel through the one or more nodes commanded to function at the operation parameters. The diverted communication channel may have a different path compared to the communication channel before the migration of the workload. The server may be further configured to: assign an interval for the migration; release the nodes on which the portion of the workload is migrated, after the interval has passed; and return the communication channel to the path before the migration of the workload.

Where the network of the third aspect is regulated by a communication protocol that implements an intelligence layer that determines a path for a communication channel for the communication channel, at least one node along the communication channel may remain the same after the migration of the portion of the workload.

Where the data communication of the third aspect is effected by a deployed application, the workload may comprise computation required to process the data communicated by the deployed application. One or more of the nodes that share the computation may belong to a cluster within a same network.

The processor of the third aspect may be further configured to compare the application performance metrics against performance requirements in response to the server detecting a deterioration in the measured application performance metrics.

The determination of the operation parameters to achieve service at the performance requirements of the third aspect may be computed by a classification algorithm that models a relationship between the network cost and performance optimisation. Alternatively, the determination of the operation parameters to achieve service at the performance requirements may result from a selection from a list of available operation parameters.

BRIEF DESCRIPTION OF THE DRAWINGS

Representative embodiments of the present invention are herein described, by way of example only, with reference to the accompanying drawings, wherein.

DESCRIPTION OF THE INVENTION

Figure 1:
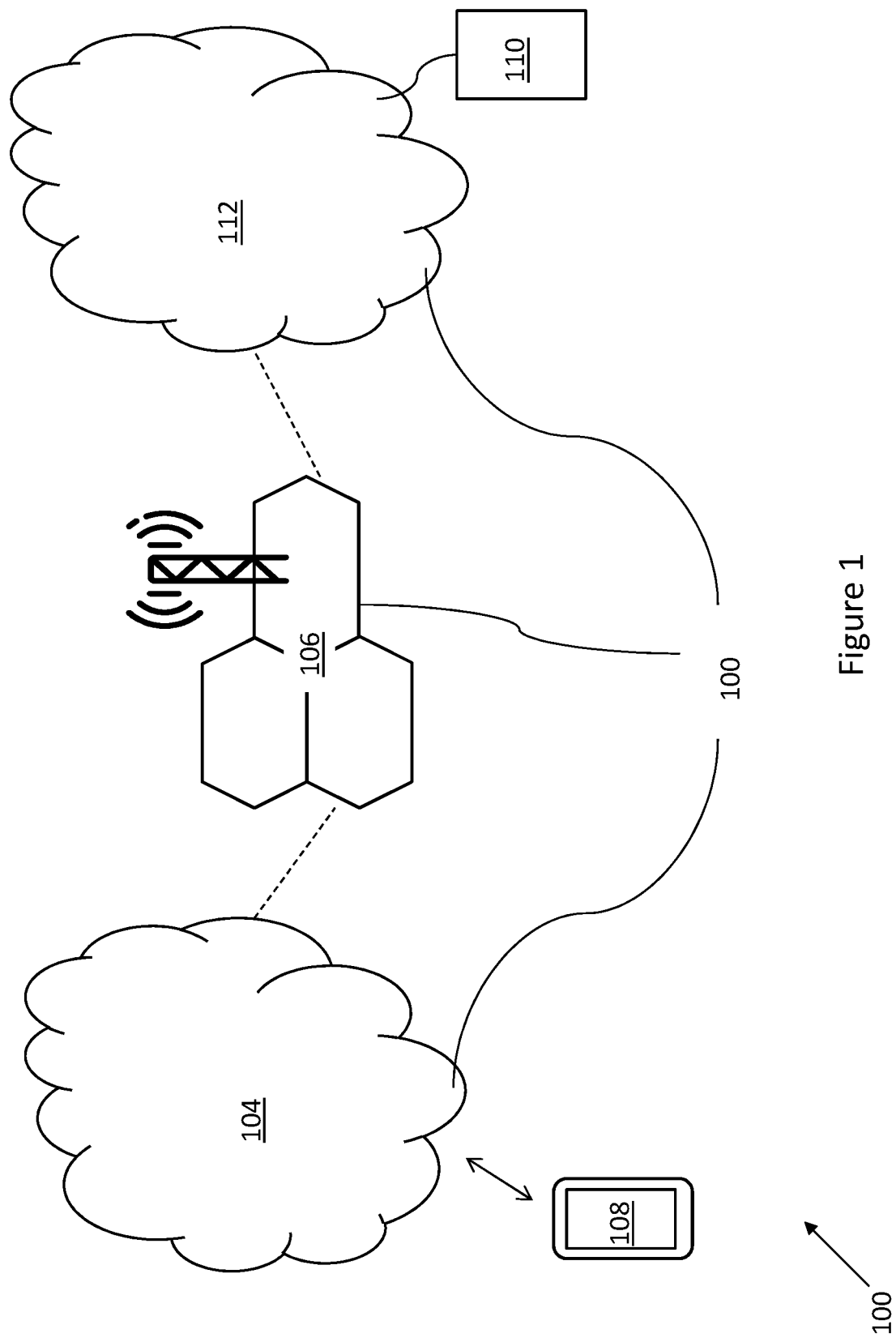
FIG. 1 shows a network that incorporates a system configured to optimise data communication in accordance with various embodiments of the present invention.

In the following description, various embodiments are described with reference to the drawings, where like reference characters generally refer to the same parts throughout the different views.

The present application, in a broad overview, provides a system to optimise data communication between devices connected to a network, where one device provides a source for the data, while another device provides a destination for the data (e.g. a smartphone receiving a live stream video feed captured by a remotely located camera) through the proper allocation of resources available in the network. The system enables end to end service assurance across devices, telecommunication networks and public cloud infrastructure. The system deploys an architecture which groups participants (any apparatus with processing capability implementing the system architecture) into one of four logic layers: a data layer; a transformation layer; an intelligence layer and an orchestration layer, with the intelligence layer being responsible for optimising data communication. Within the present disclosure, participants that belong to any of the four logic layers are referred to using a specific label depending on which of the functions the participant fulfils at a particular instance. For instance: "server" for those that belong to the intelligence layer; "terminal" for those that belong to the orchestration layer; "device" for those that connect to the network to communicate data generated from executing an application. It will be appreciated that any hardware, with sufficient processing capability, can be used for any of the four layers. Thus, the same hardware can perform as the data layer, the transformation layer, the intelligence layer and the orchestration layer depending on required application performance metrics and the network status at a particular instance.

The intelligence layer effects optimisation of data communication by ensuring that application performance metrics should be within performance requirements specified by, for example, a service level agreement. Application performance metrics refer to parameters used to measure the efficacy of software applications that output the data communicated between the devices connected to the network. Non exhaustive examples of measurements that affect these parameters include CPU utilisation, memory utilisation, concurrent load, time to respond, bandwidth, latency and packet loss. In the context of the present system architecture, the application performance metrics impact end user experience, such as the duration the end user has to wait between request and delivery. For instance, low latency is preferred for time sensitive service requests with real-time applications, such as a video conference call. These metrics may thus apply on one or more of any infrastructure within the network, such as first end device running an application that taps into the network and second end device connected to the network that serves a request made by the application, along with any other computer hardware belonging to either of the data layer, the transformation layer, the intelligence layer and the orchestration layer that is responsible for allowing data communication between the first and second end devices.

Should the application performance metrics fall below performance requirements, a server of the intelligence layer identifies whether there are nodes in the network with untapped computing resources, i.e. nodes that have available capacity for additional computational work. Such nodes include those that are already facilitating data communication between the devices that are connected to the network, whereby the intelligence layer detects that these nodes have available computing resources that can be tapped to optimise the data communication. These utilised nodes may thus already lie along a path established for the communication channel used for the data communication when the intelligence layer measures application performance metrics. Other nodes that may be identified include those with available computing resources and are not involved in facilitating data communication between the devices. These unutilised nodes do not lie along the path established for the communication channel used for the data communication when the intelligence layer measures application performance metrics.

The intelligence layer determines operation parameters that achieve service at the performance requirements specified by the service level agreement. The intelligence layer then commands one or more of these nodes having untapped computing resources to function at the determined operation parameters and migrates at least a portion of workload associated with the data communication to the one or more nodes commanded to function at the operation parameters. Workload refers to computation required to process the data communicated by a deployed application and includes tasks that occur as this data is relayed between the devices connected to the network. These tasks range from basic computational activities, such as introduction of data packet headers to ensure that the data is correctly routed to the next node along a communication channel used for the data communication; to more substantial computational activities, such as data analytics, that may be in addition to the introduction of data packet routing headers. Such substantial computational activities allow for heavy computational processing, which may be beyond the capability of the end device that provides the data, to be offloaded onto a node with sufficient computational processing capability. The substantial computational activities depend on the purpose of the data being communicated between the devices and the role of the node that receives the data, where this purpose is in turn determined by an application that effects the data communication between the devices. Non exhaustive examples include: a weather forecast application, where an end device is a simple temperature sensor and one of the nodes that relays temperature data from the temperature sensor performs analytics such as predicting weather conditions for the following week; a surveillance application, where an end device is a simple camera and one of the nodes that relays the video feed data from the camera performs analytics such as facial recognition against an external database; and a remote control application, where an end device is a robot with various monitoring sensors and one of the nodes that relays the monitoring sensors data feed from the robot performs analytics such as determining whether each of the data feeds indicates that the robot is operating normally.

The migration refers to reallocation of the workload amongst the one or more nodes having untapped computing resources. The path of the communication channel after migration depends on the one or more nodes within the network that are identified to have untapped computing resources. If only nodes that lie along the communication channel already used for the data communication are identified (i.e. the above mentioned "utilised nodes"), whereby migration to achieve data optimisation involves reallocation of computing resources along the existing communication channel, then the path of the communication channel remains the same after migration. However, the path of the communication channel may change even if only utilised nodes are identified, for example when the migration of the workload omits several nodes from the existing communication channel. The path of the communication channel also changes after migration if only other nodes within the network are identified (i.e. the above mentioned "unutilised nodes" that lie outside of the communication channel); or if a mixture of utilised nodes and unutilised nodes are identified. The new node for migrating workload that is in respect of an application can lie in any part of the network, such as on premise datacentres; or cloud infrastructure, e.g. private cloud, public cloud and edge cloud.

The system is advantageous in situations where the network is comprised of clusters which are interconnected by different service providers. The nodes that relay data transmitted between devices that are connected to the network may then also be interconnected by different organisations. For instance, one of two devices connects to a gateway serviced by a first private computer cloud network, while the other device may be a smartphone that is serviced by a second private cloud network. The two private computer cloud networks may then be connected through one or more telecommunication network operators. The nodes that relay the data between the two devices may then span across the first private computer cloud network, the second private computer cloud network and the one or more telephone network operators.

The devices that connect to the network may be any apparatus with operating system capability, such as smartphones or computer terminals. Other examples of devices include IoT (Internet of things) objects that contain embedded electronics with a unique identifier that enables them to connect to the Internet, to smartphones, or to other IoT devices. In contrast to smartphones, such IoT devices may only possess processing capability that is sufficient to perform their intended function (such as temperature sensing).

The intelligence layer thus functions as an application performance management tool to monitor and manage operating parameters of one or more participants in the network that an application utilises to transmit data across the network, so that the application performance is maintained at an expected level of service.

FIG. 1 shows a network 100 that incorporates a system configured to optimise data communication in accordance with various embodiments of the present invention. The network 100 has several clusters, each of which may be administered by a different organisation. For the sake of simplicity, FIG. 1 only shows three clusters: a first cloud computer network 104, a second cloud computer network 112 and a telecommunication operator network 106.

In FIG. 1, two devices 108 and 110 connect to the network 100, which serves as a medium for data to be communicated between the two devices 108 and 110. Only two devices are shown for the sake of simplicity, where it will be appreciated that more than two devices can connect to the network 100 at any instance.

Data is communicated when one of the devices 108 and 110 requests for a service, which is provided by the other of the devices 108 and 110, for example, for being amongst the capabilities of the other device. FIG. 1 illustrates the service being requested by device 108 (which may be a smartphone or any desktop computer), with the service being provided by device 110 (which may be a video camera). The device 108 may identify that the device 110 provides the service, in the scenario where the service is specific and only catered for by a limited number of service providers. Alternatively, the device 110 may be randomly selected to provide the requested service, if such specificity is absent.

The connection schematic of FIG. 1 is also adopted when the devices 108 and 110 have a SIM module interface and can connect directly to the telecommunication operator network 106. One or more intermediary devices may connect the devices 108 and 110 to their respective cloud networks 104 and 112. For instance (not shown), the device 108 may couple to the first cloud computer network 104 through a gateway and the device 110 may couple to the second cloud computer network 112 through a gateway. This applies when the devices 108 and 110 lack a SIM module interface and connect over local protocol like Bluetooth to a gateway and the gateway connects to the telephone operator network. In another implementation, the respective gateways belong to the first cloud computer network 104 and the second cloud computer network 112.

Figure 2:
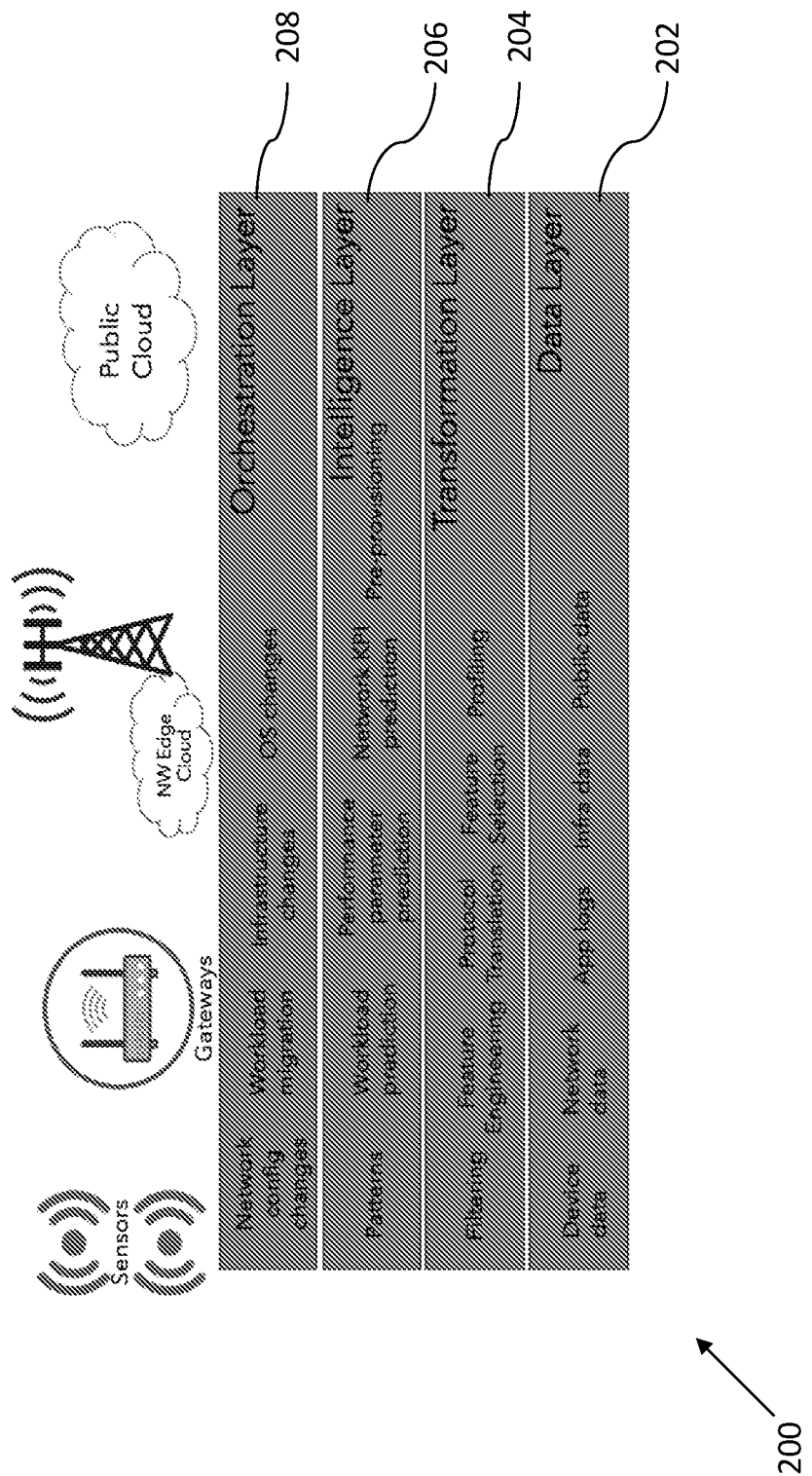
FIG. 2 shows the architecture of the data optimisation system of FIG. 1.

The data optimisation system has an architecture 200 that is shown in FIG. 2.

The architecture 200 of the command and control fabric that allows the system of FIG. 1 to optimise data communication has four logic layers namely: a data layer 202, a transformation layer 204, an intelligence layer 206 and an orchestration layer 208. The entire architecture 200 is microservice based and decentralised. For e.g., the transformation layer 204 can run either in the cloud (confer the first cloud computer network 104 and the second cloud computer network 112 of FIG. 1) or in gateways belonging to or separate from the cloud. The orchestration layer can run across the board, i.e. from the end devices 108 and 110 to any nodes within the network 100. Each layer comes in a multi-architecture binary form to be deployed in any hardware. For e.g., the transformation layer 204 comes as an executable for the cloud, as a firmware for devices and gateways, as a container for hardware agnostic deployment and as an iOS/Android app for smartphones. The functions of each of the layers 202, 204, 206 and 208 are described below, with reference to FIG. 1 where appropriate.

Data Layer 202

The data layer 202 refers to network 100 participants that collect analytics that impact the efficacy of data communication between the devices 108 and 110. These analytics include the following data related to, for example, IoT deployment.

Hardware data (processor type, memory capacity, etc)
Infrastructure consumption logs (memory consumed, CPU load, etc)
Network logs (bandwidth usage, latency, throughput, packet loss, etc)
Application logs (errors, warnings, response time)
User load (number of requests, sessions, etc)
Cloud Infrastructure data (# of virtual machines (VM), VM specification, cloud network latency)

The data layer 202 can also collect data from public data sources that are critical to make informed decisions for application performance optimisation. Examples of public data sources include vehicle traffic, weather etc.

The data layer 202 also provides a template where applications can report any specific data points that are to be collected and processed. Also, applications can report the expected performance criteria (in terms of average query latency, throughput etc). The data layer 202 stores this information for use by the intelligence layer 206 to make informed decisions about optimisations that can be done across the board from workload migration to network 100 configuration changes in real time.

Transformation Layer 204

The transformation layer 204 refers to network 100 participants that have data processing libraries to filter and transform data in a format that is memory efficient for storage. Examples of functions provided by the transformation layer 204 include feature selection, protocol translation and reporting. Examples of reports from the transformation layer 204 are: sliding window of bandwidth consumption of the application to ensure no anomalous consumption; and average concurrent traffic handled by application to ensure no drop in application performance. The transformation layer 204 generates these reports to facilitate the intelligence layer 206 to perform instant root cause analysis of performance drops. The reports generated by the transformation layer 204 may also be made available through a user interface.

The data processing libraries allow the transformation layer 204 to facilitate transformation of data into a format compatible with protocol used in the other layers implemented by the architecture 200. The transformation layer 204 can also perform the necessary feature engineering for the machine learning models in the intelligence layer 206. The data transformation libraries are flexible and can run in a completely distributed mode to process huge volumes of continuous data streams or can also scale down and run as a container on an IoT gateway.

Intelligence Layer 206

The intelligence layer 206 is the core of the architecture 200. The intelligence layer 206 refers to network 100 participants that make real time decisions in the location, within the network 100, where the other layers of the architecture 200 should run. As mentioned above, computer infrastructure belonging to the intelligence layer 206 are labelled "servers". The decentralised nature of the architecture 200 means that any of the servers can perform as a master or a slave, depending on data optimisation requirements.

Each server in the intelligence layer 206 is configured to measure application performance metrics of the data communication between the two devices 108 and 110. Application performance metrics refer to parameters used to measure the efficacy of software applications that output the data communicated between the devices 108 and 110 connected to the network 100. Since the intelligence layer 206 also determines a path for a communication channel for the data communication, the application performance metrics that the server of the intelligence layer 206 monitors include parameters, existing along the communication channel, that determine the efficacy of applications that impact the data communication between the two devices 108 and 110. The communication channel refers to a path taken, within the network 100, for data packets transmitted between the two devices 108 and 110. The path may utilise physical transmission medium such as wires, or wireless mediums such as a radio channels.

In an implementation where the data communication is effected by a deployed application in the device 108, the application performance metrics include usage of computer infrastructure that process the data communicated by the deployed application. The application performance metrics that are monitored in this implementation, or in any other implementation, include parameters that affect throughput and latency, such as processor load average, processor utilisation and memory utilisation.

The server compares the measured application performance metrics against performance requirements. Such performance requirements may be specified by, for example, a service level agreement which sets out expected performance levels in terms of parameters that include data rate delay, error rate, port availability and network uptime.

The server in the intelligence layer 206 detects, in response to the application performance metrics being below the performance requirements, utilisation of computing resources within the network 100 to identify nodes having untapped computing resources. These nodes refer to any computing resource that is part of the network 100 and may be located in any one of the following locations: a network edge; the telecommunication operator network 106; or a cloud computer network (the first cloud computer network 104 or the second cloud computer network 104).

With the nodes having untapped computing resources identified, the server determines operation parameters that achieve service at the performance requirements. In one approach, the determination of the operation parameters results from predicting information relating to any one or more of a reaction time before there is performance degradation beyond a threshold value, current infrastructure performance and load factor, which are discussed in greater detail below. Such information may be acquired from executing techniques that are based on moving average and auto regressive algorithms. The server then commands one or more of the identified nodes to function at the operation parameters and migrate at least a portion of workload associated with the data communication amongst the one or more of the nodes commanded to function at the operation parameters.

During this migration, the communication channel used to transmit data between the devices 108 and 110 may be diverted through one or more of the nodes commanded to function at the operation parameters, if these nodes are not already facilitating data communication. The diverted communication channel then has a different path compared to the communication channel before the diversion. In one implementation, the server assigns an interval for the migration. After the interval has passed, the server releases the nodes on which the portion of the workload is migrated; and returns the communication channel to the path before the migration of the workload.

Figure 3:
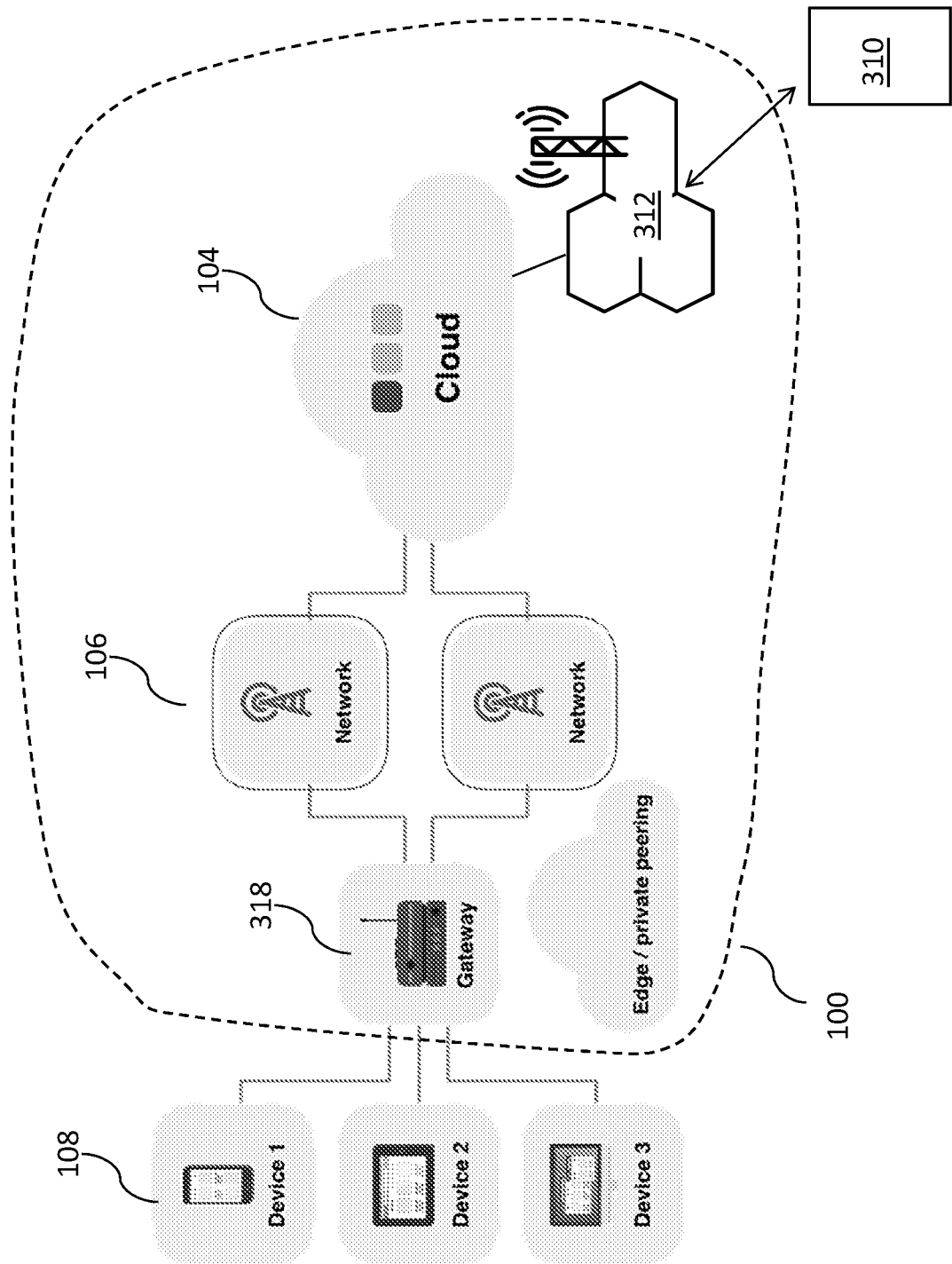
FIG. 3 shows the network of FIG. 1 with a gateway layer.

During migration of the workload, the intelligence layer 206 may instruct the orchestration layer 208 to migrate latency sensitive transformation and filtering functions (from the transformation layer 204) to be deployed at the gateway. This may occur in situations where a server in the intelligence layer 206 detects deterioration in the measured application performance metrics, brought about by, for example, a sudden spike in incoming data velocity and volume. The intelligence layer 206 has a suite of machine learning algorithms that are trained to make real time decisions to ensure cost and performance optimisation of applications. This is done by each server in the intelligence layer 206 being configured to compute the operation parameters to achieve service at the performance requirements through a classification algorithm that models a relationship between the network cost and performance optimisation. The intelligence layer 206 is thus responsible for ensuring that applications are performing within an agreed service level agreement (SLA). With reference to FIG. 3 (which when compared to the schematic shown in FIG. 1 shows a gateway 318 layer connecting the device 108 to the telecommunication operator network 106; and omits the second cloud computer network 112 and its connected device 110), additional functions of the intelligence layer 206 include:

Device 108/Gateway 318 side:
Deciding when, what and how long, latency sensitive workload should be migrated to gateways and sensors.
Hardware changes necessary to support new workloads or change in patterns of existing workload (e.g. enabling 3D acceleration etc.)
Decisions on advanced loggers that should be enabled to handle incidents, on demand.

Network 100 side:
Making informed decisions on over the top changes that should be executed in the network to accommodate incidents. (e.g. increasing bandwidth allocation to specific sim cards, to accommodate temporary spike in payload)
Making security decisions (e.g. blacklisting rogue connections etc.)

Cloud 104 side:
Decisions on workload migration from one data center to another
Decisions on scalability and performance (increasing CPU allocation, number of virtual machines (VM), etc)
Decisions on edge deployments (migrating workload from network edge private cloud to public cloud)
Decisions on security (firewall changes to mitigate security incidents)

Orchestration Layer 208

The orchestration layer 208 has terminals that are configured to execute the decisions of the servers belonging to the intelligence layer 206. These decisions include choosing one or more of the nodes within the network 100 to migrate workload, such as migrating workload from public cloud to private cloud at network edge. Other functions of the orchestration layer include rapidly performing latency sensitive data transformation actions especially in cases where there is a spike in data velocity. The orchestration layer 208 also has the capability to expand the capacity (both physical and virtual) in the private cloud at the network edge. For e.g. it can spin up more VMs in the private cloud in real time to accommodate new workloads at the network edge.

Figure 4:
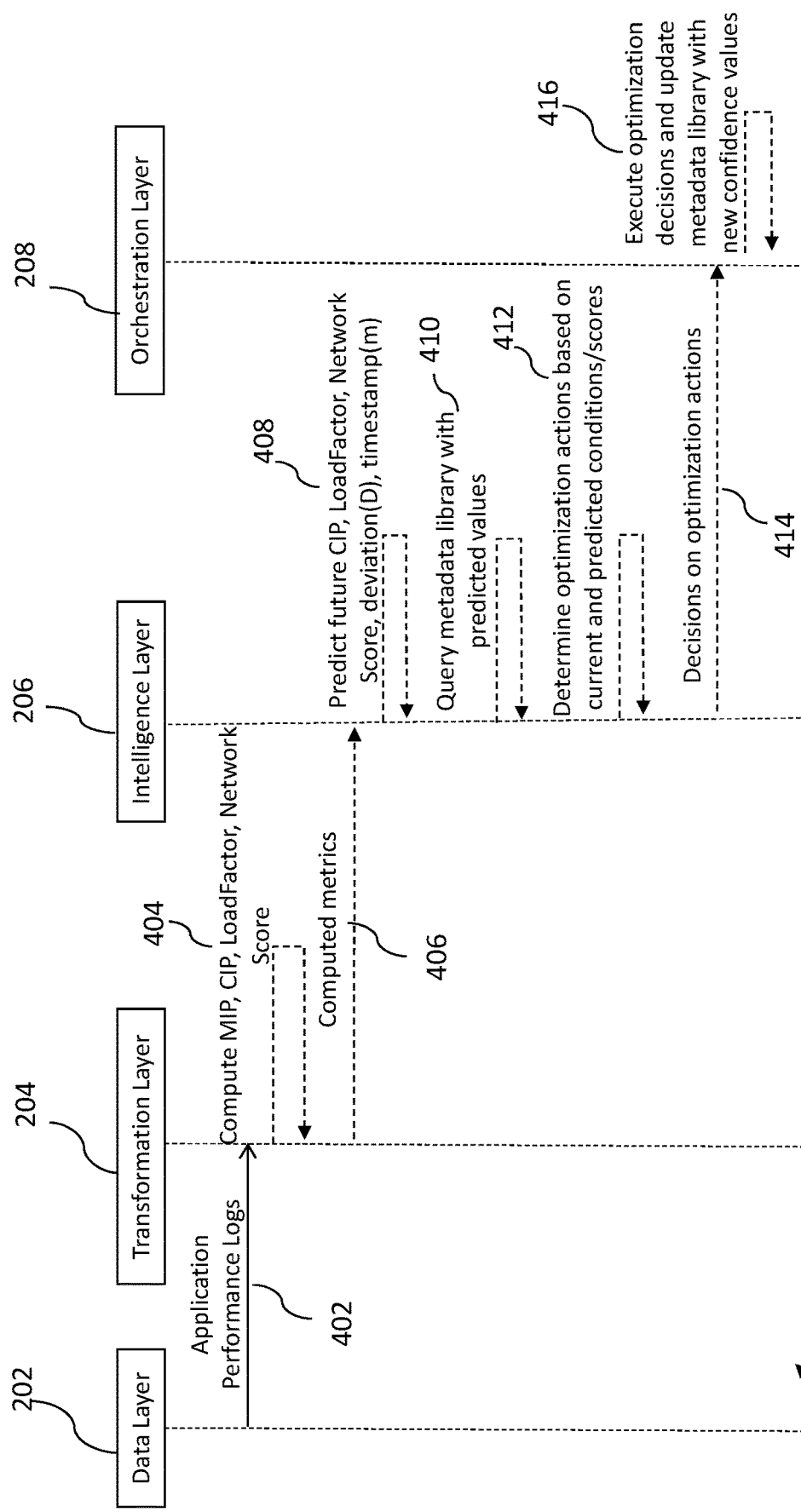
FIG. 4 shows a sequence of events that occur between the various layers of the architecture of FIG. 2.

FIG. 4 provides a sequence 400 of events 402, 404, 406, 408, 410, 412, 414 and 416 that occur between the data layer 202, the transformation layer 204, the intelligence layer 206 and the orchestration layer 208 during a data optimisation cycle. This sequence 400 is elaborated in further detail using the example of an application used to control the operation of a drone. With reference to FIG. 3, the device 108 (when it is, for example, a smart phone) may operate a video surveillance application which controls the drone 310.

The scope of video analytics might include critical aspects like intrusion detection, suspect detection, suspicious activity detection, etc. The video analytics is performed on the cloud 104, 112 and the drone 310 streams video through cellular network 312 to the cloud 104, 112. Performance guarantee of such mission critical applications is important as all incidents have to be detected in real time and the application is also computational heavy as it runs Machine Learning (ML) models on the video streams. The data layer 202 collects the data points listed above about the application performance end to end.

Examples of application performance metrics for the drone video surveillance application include:

VM used by the video analytics backend application in cloud 104:
Quantity: 3
CPU: Intel Xeon Processor
Memory: 32 GB
GPU: NVIDIA Quadro
Cellular Network throughput needed: 100 MBps The data layer 202 tracks the application performance data end to end from the cloud 104 infrastructure, application performance and network 100 performance, and stores the data in JSON format in an application performance log file as shown below.

Application_performance_Log (APL):

```
{
    "timestamp": "2020-01-28T15:50:13.513Z",
    "infra_metadata": {
        "cpu": "Intel Xeon Dual Core",
        "memory": "32GB",
        "Disk": "1TB",
        "GPU": "NVIDA Quadro",
        "Network_required": "100MBps",
        "number_of_VM": "3",
        "cloud_network_latency": "100ms"
    },
    "infra_consumption": {
        "cpu_utilization": "65%",
        "memory_utilization": "90%",
        "Disk_usage": "30%"
    },
    "network_consumption": {
        "network_bytes_out:" "204938",
        "network_bytes_in": "393898",
        "throughput": "100MBps",
        "latency": "130ms",
        "packet_loss": "0.5%",
        "bandwidth_utilization": "100MBps"
    },
    "Application_performance": {
        "errors": "3",
        "warnings": "10",
        "avg_response_time": "150ms",
        "cpu_warnings": "0",
        "disk_warnings": "0",
        "application_warnings": "10"
    },
    "Application_load": {
        "concurrent_Sessions": "100",
        "concurrent_clients": "42",
        "requests_per_second": "24"
    }
}
```

The data collected in the above mentioned format provides a measurement of application performance metrics and is sent 402 to the transformation layer 204 for further processing.

The transformation layer 204 receives the application_performance_log (APL) file and computes 404 parameters such as maximum infrastructure performance (MIP), current infrastructure performance (CIP), load factor and network score, as detailed below.

Maximum infrastructure performance (MUP) is the best possible application performance that can be expected in a hardware used by the application. The MIP of a hardware infrastructure depends on multiple factors like CPU type, memory capacity, disk capacity, network interface card, number of applications deployed in the system, concurrent load on each application, etc. The best possible performance in terms of parameters like maximum number of applications that the hardware can support, is gathered from the historic data and also information provided by manufacturers and suppliers. The MUP of every application is computed using the following formula.

$$MIP = LoadFactor * NetworkScore / No\_of\_applications$$

where $LoadFactor = (concurrent\_sessions * concurrent\_clients * requests\_per\_second)$ $NetworkScore = Maximum\_throughput / Best\_case\_latency$ (normalized between 0 to 100)

$No\_of\_applications =$ maximum number of concurrent applications that can share the hardware.

The MIP score determines the best possible performance score of the application with ideal network performance and hardware performance.

Current infrastructure performance (CIP) is the current application performance in the hardware that the application is deployed. Current infrastructure performance is calculated using the formula given below.

$$CIP_t = LoadFactor_t * NetworkScore_t / No\_of\_applications_t$$

$No\_of$ applications$_t$=the current number of applications sharing the hardware resource at time 't'.
t=timestamp $$LoadFactor_t = (concurrent\_Sessions_t * concurrent\_clients_t * Requests\_per\_Second_t)$$

Concurrent_sessions$_t$=number of concurrent sessions being executed per application at time 't'
Concurrent_clients$_t$=number of concurrent clients accessing each application at time 't'
Requests_per_second$_t$=number of concurrent client requests processed by the application per second at time 't'

$$NetworkScore_t = throughput_t / latency_t$$

where throughput$_t$=network throughput experienced by the application at time 't'
Latency$_t$=latency experienced by the application in milliseconds at time 't'

CIP$_t$ gives the performance score of the application at time 't'. The difference between CIP$_t$ and MUP gives the scope of optimization for the application to achieve best possible performance.

The computed maximum infrastructure performance (MIP), current infrastructure performance (CIP), load factor and network score is forwarded 406 to the intelligence layer 206.

The intelligence layer 206 receives the MUP, CIP, load factor and network scores of the application in real time. The intelligence layer 206 considers the CUP scores for the past 'n' time instances and predicts multiple application performance metrics for the future 'M' time instances in order to compute performance degradation levels to choose the most accurate optimisation action to restore application performance.

The intelligence layer 206 first predicts the CIP scores of future 'M' time instances based on the CUP scores for the past 'n' instances along with the infrastructure metadata (like number of applications deployed, concurrent load etc) using the formula mentioned below.

Let Xi={Xi$_{(t-n)}$, ... Xi$_t$} be the realized values of the CIP from time 't-n' to time 't'

The hazard function has the form $$\lambda(t|X_i) = \lambda_0(t)\exp(\beta_1 X_{i1} + \ldots + \beta_p X_{ip}) = \lambda_0(t)\exp(X_i\beta).$$

This expression gives the hazard function at time t for CIP with covariate vector (explanatory variables) Xi.

The intelligence layer 206 predicts the time instance when the CUP current score halves, i.e. an estimate for the time left until the performance degradation becomes twice as bad is obtained. The likelihood of the CIP current score dropping to half at time Yi can be written as:

$$L_i(\beta) = \frac{\lambda(Y_i \mid X_i)}{\sum_{j:Y_j \geq Y_i} \lambda(Y_i \mid X_j)} = \frac{\lambda_0(Y_i)\theta_i}{\sum_{j:Y_j \geq Y_i} \lambda_0(Y_i)\theta_j} = \frac{\theta_i}{\sum_{j:Y_j \geq Y_i} \theta_j}$$

where $\theta_j = \exp(X_j \cdot \beta)$ and the summation is over the set of subjects j where the event has not occurred before time Yi (including subject CIP(i) itself). Obviously $0 < L_i(\beta) \leq 1$. This is a partial likelihood: the effect of the covariates can be estimated without the need to model the change of the hazard over time.

Using the above formula, the likelihood of performance drop of the CIP current score by half is calculated for future 'M' instances, where 'M' is the time instance when the likelihood of the CIP current score halving is more than 80%. The value of 'M' gives the reaction time that the intelligence layer 206 has to optimise the application performance before there is performance degradation beyond a threshold value.

Once the value of 'M' is determined, the next step is to predict the values of load factor and network score from time 't' to time 't+M'. The values of load factor and network score are predicted using the formula given below.

Given a time series data X, (in this case load factor and network score) where t denotes the latest timestamp until which the data is recorded and X, are real numbers, the prediction formula is, $$\left(1 - \sum_{i=1}^{p} \phi_i L^i\right)(1-L)^d X_t = \delta + \left(1 + \sum_{i=1}^{q} \theta_i L^i\right)\varepsilon_t.$$

where L is the lag operator and $\varepsilon_t$ the error term, i the number of instances, p the number of time lags to predict, $\emptyset_i$ the lag operator, q the order of moving average model, $\theta_i$ the hyper-parameter of the moving average part and $\partial$ the multiplicity.

The formula is used to predict the values of load factor and network score from current time 't' to the time 'M', that is the predicted time instance where a significant performance drop is expected.

The intelligence layer 206 now has the following information to determine the best optimisation actions, which is shown as event 408 in FIG. 4:

i. M, time instance when the performance of application will drop significantly, which provides a reaction time before there is performance degradation beyond a threshold value, e.g. 50%
ii. LoadFactor$_t$, LoadFactor$_{(t+1)}$ . . . LoadFactor$_{(t+M)}$, denotes the predicted load factor of the application from current time 't' to time 'M' when the application performance is expected to drop.
iii. NetworkScore$_t$, NetworkScore$_{(t+1)}$ . . . NetworkScore$_{(t+M)}$, denotes the predicted network performance that will be experienced by the application from current time 't' to the time 'M' when the application performance is expected to drop.
iv. CIP$_t$, CIP$_{(t+1)}$ . . . CIP$_{(t+M)}$—denotes the predicted infrastructure score from time 't' to 'M'
v. D$_t$, D$_{(t+1)}$, . . . D$_{(t+M)}$—denotes the predicted deviation in expected application performance versus the best possible application performance in the given infrastructure and network setup.

One or more of the this information is required for the intelligence layer 206 to determine suitable optimisation actions for the application, i.e. allows the intelligence layer 206 to determine operation parameters that will achieve service at performance requirements.

Figure 5:
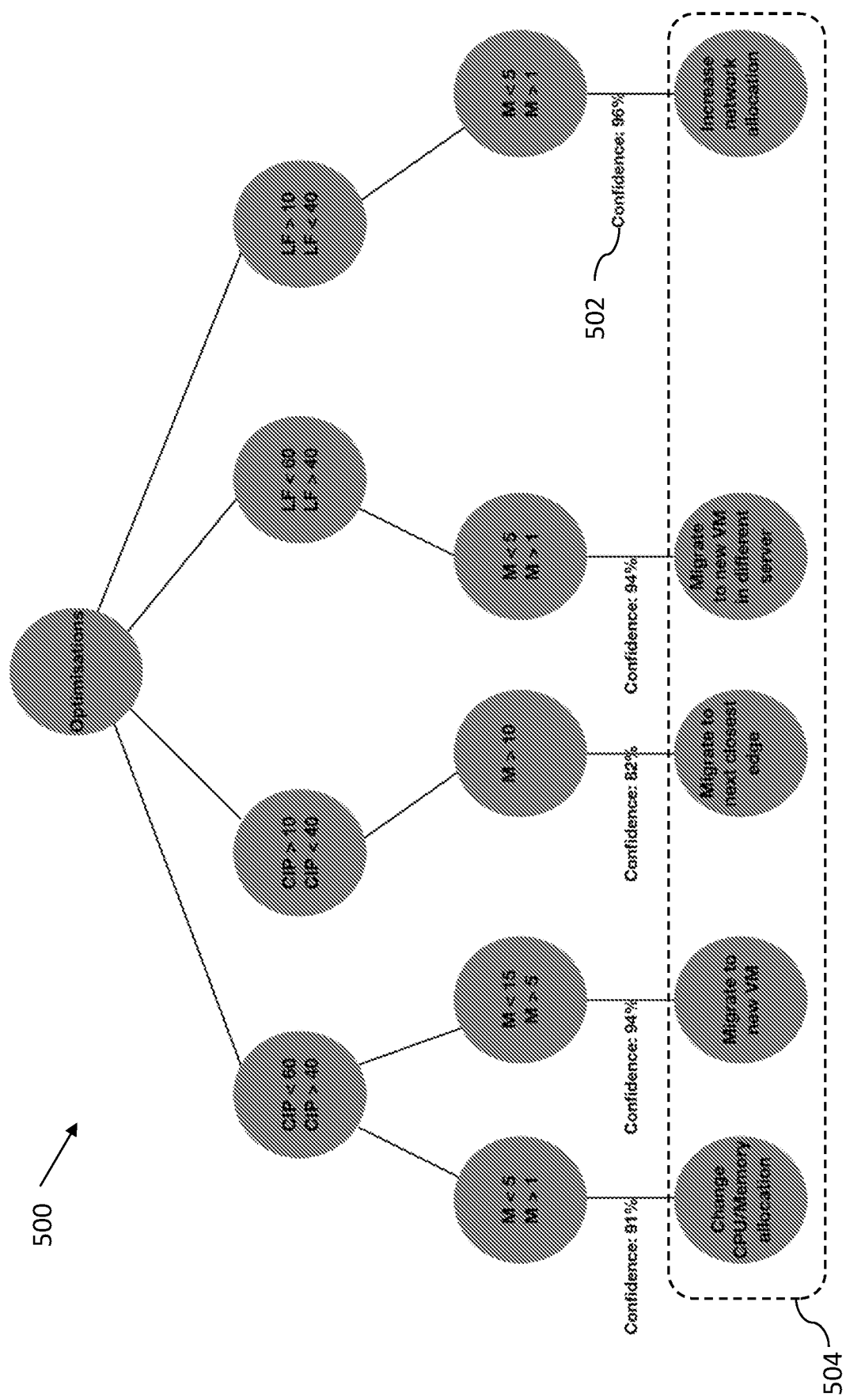
FIG. 5 shows a decision tree structure of a classification algorithm used by the data optimisation system of FIG. 1.

The intelligence layer 206 has a metadata library 500 shown in FIG. 5 that denotes combinations of predicted information (M, LoadFactor, NetworkScore, CIP and D) that will arrive at network settings 504 having operation parameters that will achieve service at performance requirements. These network settings 504 provide a list of available operation parameters that are selectable and which will achieve service at the performance requirements.

The metadata library 500 has a decision tree structure and the tree is empirically built based on domain expert input and historic trends. For instance, the decision tree may use a classification algorithm that models a relationship between the network 100 cost and performance optimisation. The intelligence layer 206 performs a query 410 on the metadata library through a tree traversal with the predicted information on CIP, M, LoadFactor, NetworkScore and D to determine 412 suitable optimisation actions. D, the predicted deviation in expected application performance, is used to determine the scope of best possible optimisation of application performance. D is used as an edge property that connects the nodes of the decision tree. Every optimisation action has a confidence score 502 in the tree, which denotes that confidence in which that particular action has helped in the past to reduce application performance degradation.

For example, if the CIP$_{(t+M)}$=55 and M=13, this denotes that the intelligence layer 206 predicts a 13 minute interval before the performance of the application drops to CIP$_{(t+M)}$. As per the metadata library 500 tree traversal, the decision obtained for this condition is to migrate to a new VM. This optimisation action decision is passed 414 to the orchestration layer 208 to spin up a new VM with X % higher CPU and memory, where X is determined empirically based on hardware manufacturer input and past historic trends.

Once the orchestration layer 208 executes 416 the optimisation action to spin up a new bigger VM and migrate the application to the new VM, the CIP$_t$, LoadFactor and NetworkScore for the application is tracked in real time. If the application performance improves after the migration, the confidence level of the metadata library 500 is updated. If there is degradation in performance, the confidence for the particular optimisation action stored in the metadata library 500 is reduced. This ensures that the metadata library 500 evolves with change in conditions and application performance trends.

Returning to FIG. 2, the architecture 200 can be deployed through the use of containers, each packaging code that implements a respective layer 202, 204, 206 and 208 of the architecture 200. For example, a container that can deploy a server of the intelligence layer 206 may come from a non-transitory processor-readable medium storing code for optimising data communication between devices connected to a network. Such code that can deploy a server of the intelligence layer 206 represents instructions that when executed causes a processor to: measure application performance metrics of the data communication between the devices; compare the application performance metrics against performance requirements; detect, in response to the application performance metrics being below the performance requirements, nodes having untapped computing resources within the network; determine operation parameters achieving service at the performance requirements; command one or more of the nodes to function at the operation parameters; and migrate at least a portion of workload associated with the data communication amongst the one or more nodes commanded to function at the operation parameters.

Figure 6:
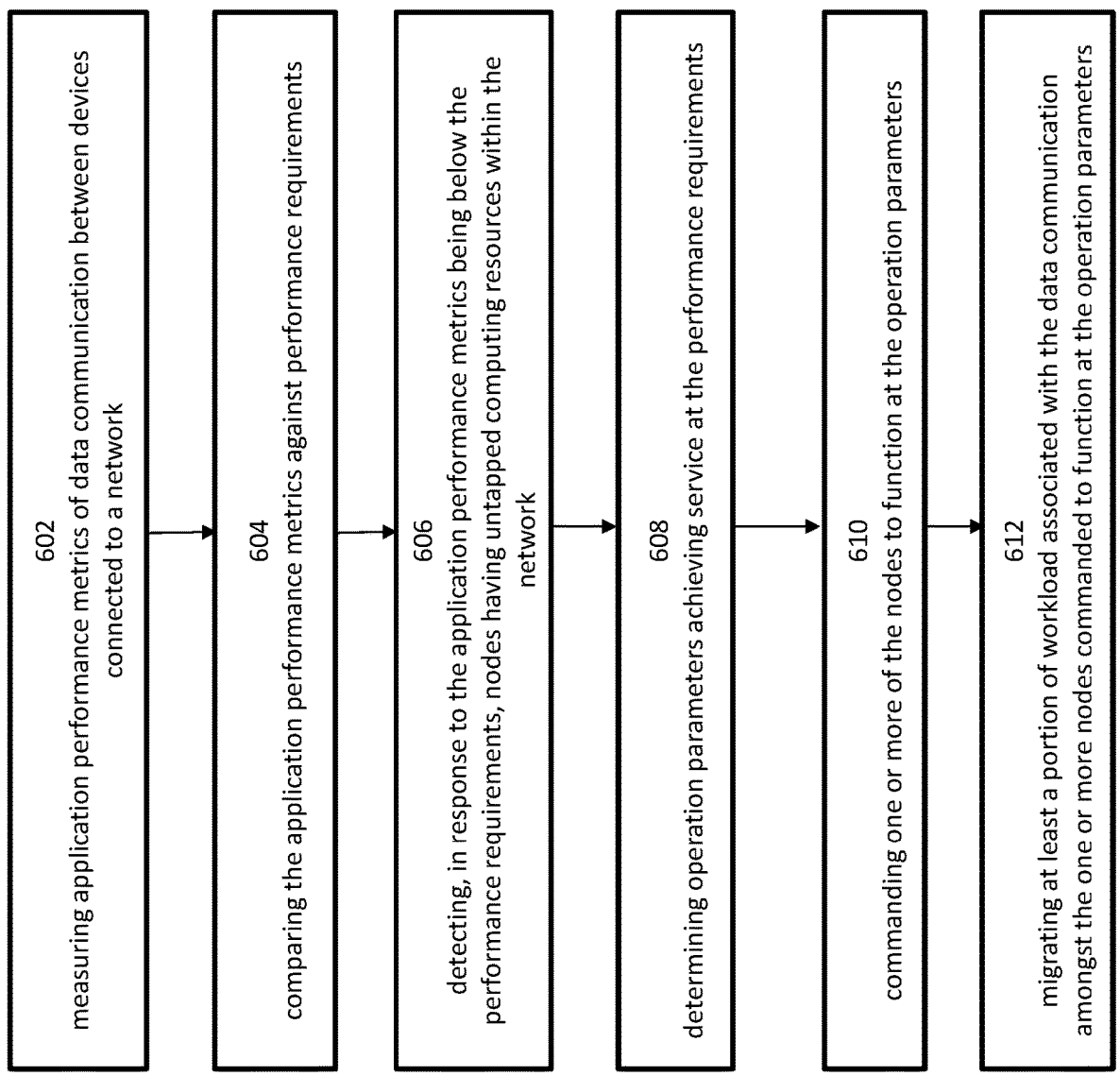
FIG. 6 shows a flowchart to optimise data communication in the network of FIGS. 1 and 3.

When a server of the network 100 of FIGS. 1 and 3 deploys a container that implements the intelligence layer 206, the server optimises data communication between devices 108, 110 and 310 connected to the network 100 in accordance with a method having the steps shown in FIG. 6.

In step 602, application performance metrics of data communication between the devices 108, 110 and 310 is measured. In step 604, the application performance metrics against performance requirements is compared. In step 606, nodes having untapped computing resources within the network 100 are detected, in response to the application performance metrics being below the performance requirements. In step 608, operation parameters achieving service at the performance requirements are determined. In step 610, one or more of the nodes having untapped computing resources are commanded to function at the operation parameters. In step 612, at least a portion of workload associated with the data communication is migrated amongst the one or more nodes commanded to function at the operation parameters.

Figure 7:
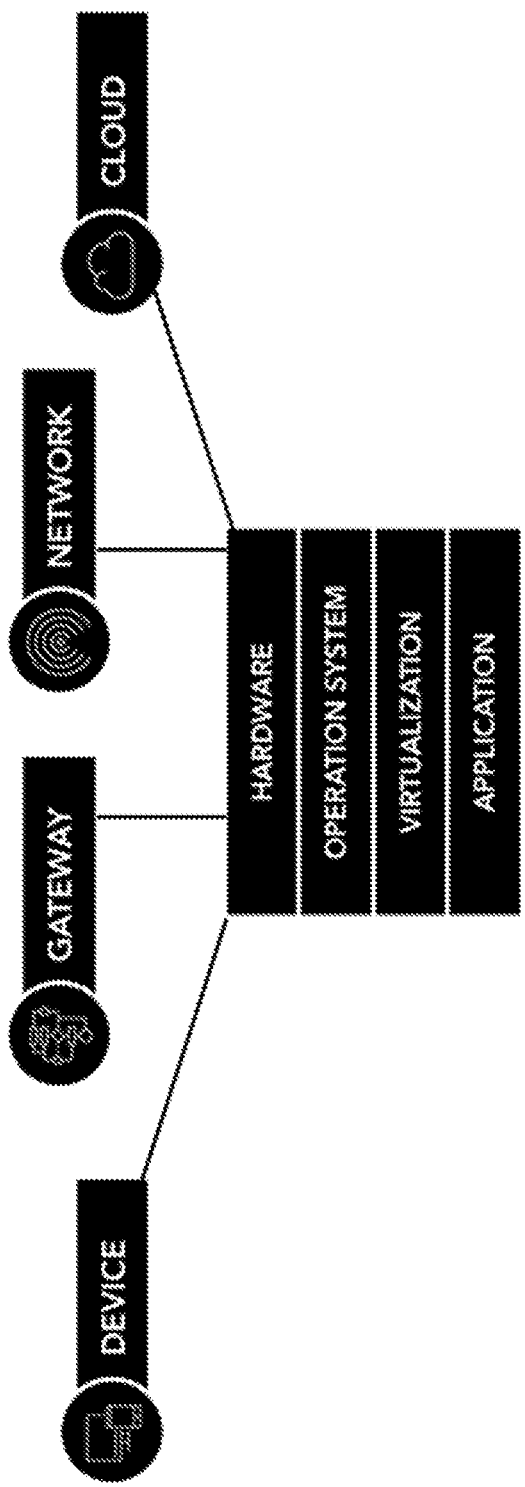
FIG. 7 provides a visual summary of the multi-layered and multi-point command and control fabric provided by the data optimisation system of FIG. 1.

FIG. 7 provides a visual summary of the multi-layered and multi-point command and control fabric provided by the data optimisation system of FIG. 1.

The data optimisation system provides a horizontal framework that can perform multi-layered and multi-point command and control for IoT networks (i.e. network that connects devices to gateways and cloud). The capabilities of the multi-layered command and control include the following.

Provisioning new devices (Sensors and gateways) on the fly in real time in the IoT networks to ensure business continuity and performance optimization.

Deploying new versions of a device (sensor or gateway) firmware over the air.

Changing the device settings and provisioning new certificates/users over the air.

Pushing a new workload to gateways for edge computing to optimise performance (latency and throughput).

Changing cellular network settings (bandwidth allocation etc.) in real time to optimize I/O speeds, connectivity and coverage.

Creating a private network edge IoT cloud on the fly (small cluster of servers private peered to telecom access network) to perform computation at the network edge for performance optimization.

Migrating workloads in real time between private network edge cloud and public cloud (includes migration from one datacenter to another in public cloud)

Optimising hardware settings including CPU, memory, network settings and allocation to applications, virtual machine configuration etc. to ensure optimal application performance.

The advantages provided by such multi-layered and multi-point command and control fabric include the following:

End to end multilayered performance optimisation that spans across hardware, OS, virtualisation, network and application layers all using a single horizontal intelligent control plane.

Enables computation at edge to optimise performance of applications.

Enables a transparent and programmable IoT communication network for applications.

Autonomous performance and cost optimisation of IoT applications.

Self adaptive to real time changes in network conditions, payload patterns, load factors and application performance trends.

Autonomous optimisation decisions made using predictive analytics to ensure that application performance always meets expected baseline.

Optimisation actions made based on the current application performance, load and network performance values and the predicted future values.

Self adaptive system which self learns correct optimisation decisions and penalizes itself for wrong decisions.

Zero touch end to end autonomous management of application performance across the application, VM, network and hardware layers.

In the application, unless specified otherwise, the terms "comprising", "comprise", and grammatical variants thereof, intended to represent "open" or "inclusive" language such that they include recited elements but also permit inclusion of additional, non-explicitly recited elements.

While this invention has been described with reference to exemplary embodiments, it will be understood by those skilled in the art that various changes can be made and equivalents may be substituted for elements thereof, without departing from the spirit and scope of the invention. In addition, modification may be made to adapt the teachings of the invention to particular situations and materials, without departing from the essential scope of the invention. Thus, the invention is not limited to the particular examples that are disclosed in this specification, but encompasses all embodiments falling within the scope of the appended claims.

The invention claimed is:

1. A system for optimising data communication between end to end devices connected to a network, the system comprising:
a server configured to:
measure application performance metrics of the data communication between the end to end devices;
compare the application performance metrics against performance requirements;
detect, in response to the application performance metrics being below the performance requirements, nodes having untapped computing resources within the network;
determine operation parameters achieving service at the performance requirements;
command one or more of the nodes to function at the operation parameters; and
migrate at least a portion of workload associated with the data communication amongst the one or more nodes commanded to function at the operation parameters,
wherein the determination of the operation parameters results from predicting information that comprises a reaction time before there is performance degradation beyond a threshold value, and a score calculated from the difference between a current infrastructure performance and a maximum infrastructure performance in the network,
wherein the determination of the operation parameters to achieve service at the performance requirements is computed by a classification algorithm that models a relationship between a network cost and a performance optimisation.

2. The system of claim 1, wherein the data communication is effected by a deployed application and the application performance metrics comprise usage of computer infrastructure that process the data communicated by the deployed application.

3. The system of claim 2, wherein the workload comprises computation required to process the data communicated by the deployed application.

4. The system of claim 3, wherein one or more of the nodes that share the computation belong to a cluster within a same network.

5. The system of claim 2, wherein the usage of the computer infrastructure include any one or more of throughput, latency, processor load average, processor utilisation and memory utilisation.

6. The system of claim 1, wherein the network is regulated by a communication protocol, the communication protocol implementing an intelligence layer to which the server belongs, the intelligence layer determining a path for a communication channel for the data communication.

7. The system of claim 6, wherein one of the servers can be designated a master server and each remaining server is designated as a slave server.

8. The system of claim 6, wherein the communication protocol further implements an orchestration layer, wherein the system further comprises terminals that belong to the orchestration layer, the terminals being configured to execute decisions made by the servers belonging to the intelligence layer, and wherein the decisions that the terminals execute comprise choosing one or more of the nodes to migrate the portion of the workload.

9. The system of claim 8, wherein the communication protocol further implements a transformation layer, wherein the system further comprises data processing libraries that belong to the transformation layer, the data processing libraries being configured to facilitate transformation of the received data into a format compatible with protocol used in other layers implemented by the communication protocol.

10. The system of claim 1, wherein the predictive information used to determine the operation parameters further comprises any one or more current infrastructure performance, load factor and predicted deviation in expected application performance.

11. The system of claim 1, wherein one or more of the nodes is located in any one of these locations within the network: a network edge; a telecommunication network; or a cloud computer network.

12. The system of claim 6, wherein the migration comprises diverting the communication channel through the one or more nodes commanded to function at the operation parameters.

13. The system of claim 12, wherein the diverted communication channel has a different path compared to the communication channel before the migration of the workload.

14. The system of claim 13, wherein the server is further configured to:
assign an interval for the migration;
release the nodes on which the portion of the workload is migrated, after the interval has passed; and
return the communication channel to the path before the migration of the workload.

15. The system of claim 6, wherein at least one node along the communication channel remains the same after the migration of the portion of the workload.

16. The system of claim 1, wherein the server is further configured to compare the application performance metrics against performance requirements in response to the server detecting a deterioration in the measured application performance metrics.

17. The system of claim 1, wherein the determination of the operation parameters to achieve service at the performance requirements results from a selection from a list of available operation parameters.

18. The system of claim 1, wherein the migration is to nodes along the network edge.

19. A computer implemented method for optimising data communication between end to end devices connected to a network, the method comprising:
measuring application performance metrics of the data communication between the end to end devices;
comparing the application performance metrics against performance requirements;
detecting, in response to the application performance metrics being below the performance requirements, nodes having untapped computing resources within the network;
determining operation parameters achieving service at the performance requirements;
commanding one or more of the nodes to function at the operation parameters; and
migrating at least a portion of workload associated with the data communication amongst the one or more nodes commanded to function at the operation parameters,
wherein the determination of the operation parameters results from predicting information that comprises a reaction time before there is performance degradation beyond a threshold value, and a score calculated from the difference between a current infrastructure performance and a maximum infrastructure performance in the network,
wherein the determination of the operation parameters to achieve service at the performance requirements is computed by a classification algorithm that models a relationship between a network cost and a performance optimization.

20. A non-transitory processor-readable medium storing code for optimising data communication between end to end devices connected to a network, the code representing instructions that when executed cause a processor to:
measure application performance metrics of the data communication between the end to end devices;
compare the application performance metrics against performance requirements;
detect, in response to the application performance metrics being below the performance requirements, nodes having untapped computing resources within the network;
determine operation parameters achieving service at the performance requirements;
command one or more of the nodes to function at the operation parameters; and
migrate at least a portion of workload associated with the data communication amongst the one or more nodes commanded to function at the operation parameters,
wherein the determination of the operation parameters results from predicting information that comprises a reaction time before there is performance degradation beyond a threshold value, and a score calculated from the difference between a current infrastructure performance and a maximum infrastructure performance in the network, wherein the determination of the operation parameters to achieve service at the performance requirements is computed by a classification algorithm that models a relationship between a network cost and a performance optimization.

* * * * *